3,098,592
Patented July 23, 1963

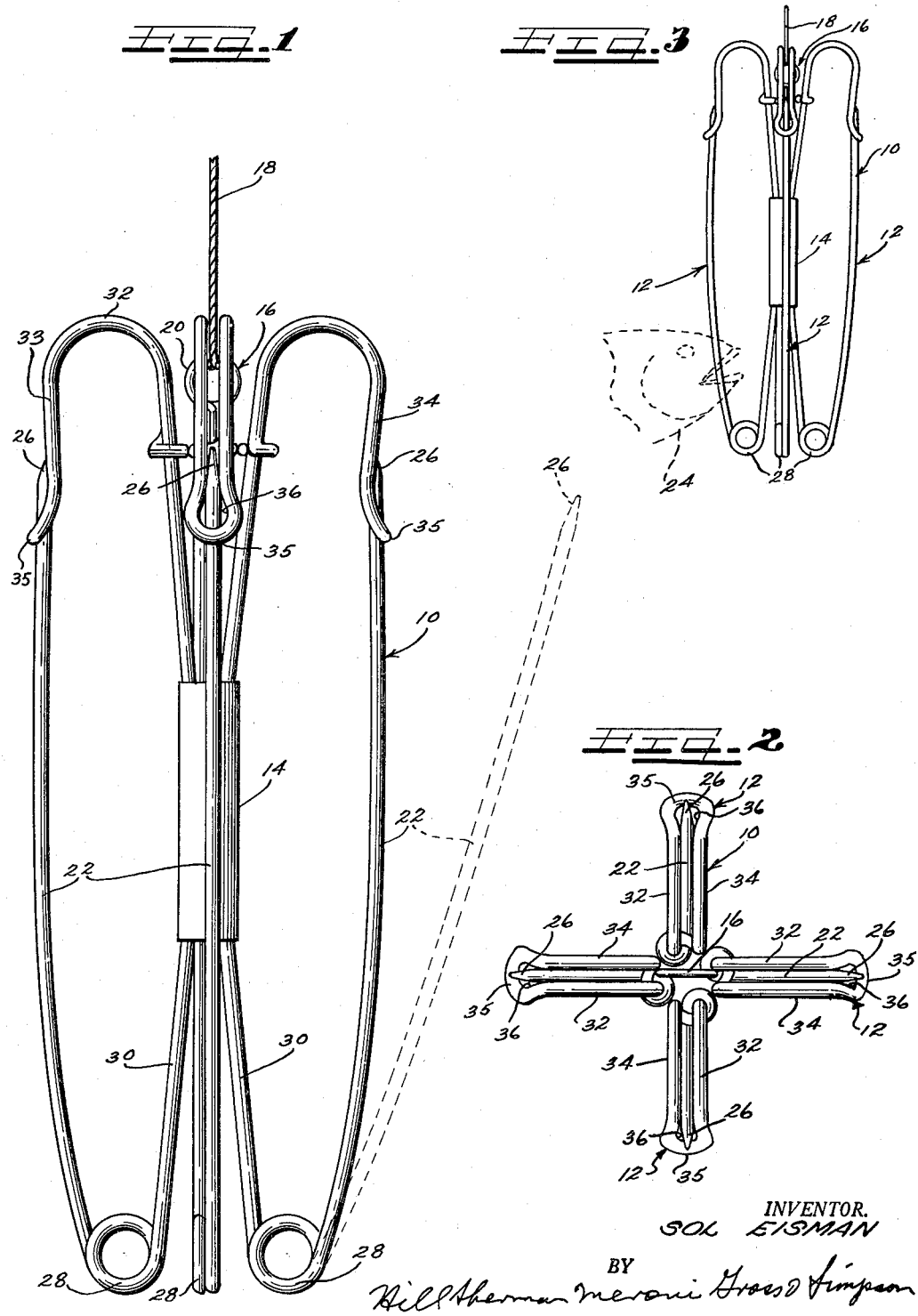

3,098,592
FISH STRINGER
Sol Eisman, 7031 Sheridan Road, Chicago, Ill.
Filed June 29, 1961, Ser. No. 120,782
1 Claim. (Cl. 224—7)

This invention relates to a fish stringer and more particularly to a device for retaining a catch of fish or the like in readily accessible position and in relatively good condition over extended periods of time.

Heretofore, fish stringers have been lengthy devices which have required the user to haul the string up into the boat in an awkward manner each time that a fish was caught, and in general such devices have damaged the fish, as for example by requiring the insertion of a hook or the like through the fish gill. The present invention overcomes these difficulties by means of an integral, unitary device which is exceptionally compact, rugged in construction and economical to manufacture. In particular, the device is characterized by a plurality of upstanding prongs having sharpened points at their upper ends, and releasably retained in a hook shaped structure extending into overlapping relation with the prongs. The hook shaped elements are each formed integrally with an upright rear extension, and the prongs are resiliently and integrally connected with individual extensions at the lower ends thereof. The rear extensions are secured in coaxial, contiguous alignment by central bracket means so that the prongs are disposed radially outwardly therefrom in angularly spaced relation. Thus the device may be transported and used as a unit and a relatively large number of fish or the like may be retained thereon and kept in fresh condition. To this end also, a loop or fastening member is coaxially inserted in the device and preferably connected to the bracket means referred to, so that a string or the like may be attached to the loop and the structure as a whole may be lowered into the water or raised as desired and with a minimum of effort.

The prong-like structures may be inserted through the jaws of the fish, whereby the damage done to the catch by previous stringers, as the result of the insertion of the retaining elements through the fish gills, is obviated. A further advantage in this respect derives from the fact that fish which are kept in a good condition and so that they may breathe while the stringer is in the water, may be released as desired, and in any event will be kept fresh for use or otherwise be preserved and kept from deterioration.

Accordingly, it is an object of the present invention to provide a fish stringer as described which is simple, compact, rugged and economical.

Another object of the invention is to provide a device as described which can retain a relatively large number of fish without any substantial deterioration in the condition thereof.

Another object of the invention is to provide a device as described wherein the need for pulling up a relatively long length of stringer is obviated and the fish are kept at a relatively uniform, readily accessible level on the stringer.

Another object of the device is to provide a fish stringer as described having a plurality of angularly spaced prongs set therearound so that the fish may be inserted on the individual prongs without interference with fish on the adjacent prongs, and with a substantial number of fish being positionable on the stringer.

Other objects and advantages of the invention will become apparent as the description proceeds in accordance with the drawings in which:

FIGURE 1 is a side elevational view of a fish stringer according to the present invention;

FIGURE 2 is a top plan view of the structure shown in FIGURE 1; and

FIGURE 3 is a side elevational view showing the stringer of the invention in use.

Referring now to the drawings, a fish stringer 10 is shown in accordance with the present invention, and includes a plurality of individual fish retaining sections 12 secured, as by a bracket or the like 14, in predetermined coaxial relationship as hereinafter further described.

Also in accordance with the invention, a coaxial retainer 16 is connected to the bracket or otherwise engaged on the device 10 so that a line or the like 18 may be secured to the loop portion 20 thereof and the stringer as a whole may be selectively raised and lowered, in accordance with the understanding of those skilled in the art.

In a preferred embodiment of the invention, each of the sections 12 includes an upstanding prong 22 of a resilient material such as a noncorrosive metal (e.g. brass, stainless steel or the like), the prongs being of a substantial length so as to retain thereupon a plurality of superposed items such as the individual fish illustrated at 24. Each of the prongs 22 is provided at its upper end with a sharpened point 26 and may be biased outwardly by means of a wound loop 28 at the lower end integrally connected to a rear extension 30 of a preferably elongated, linear construction. The rear portions 30 may be bent outwardly at 32 and downwardly at 33 in a hook-shaped configuration so that the terminal portion 34 of the extension forms a reverse turn at 35 and retraces the path of the portions 32 and 33. Thus a loop or retainer having an opening 36 is formed by each of the hook-shaped portions described, which preferably extends angularly outwardly from the axis of each of the individual sections 12 whereby to releasably engage the upper ends of the prongs 22.

The extreme terminal portions of the extensions 34 are preferably looped around the upstanding portion 20 to provide a rigid and strong article suitable for use in the outdoors. However, it will be appreciated that other means of forming the retainers or loops 36 may be encompassed within the scope of the present invention.

Each of the upstanding rear extensions 20 is secured by the bracket structure 14 in a manner such that the prongs 22 are disposed radially outwardly from a central core formed by the said upstanding brackets and in preferably uniformly angularly spaced relationship. It will also be appreciated that the rear extensions 30 may be secured together by suitable welding means, or other structures sufficient to maintain a predetermined angular relationship between the individual sections 12.

In the embodiment shown, four of the sections 12 are utilized and are disposed at substantially right angles to one another, and it will be seen that fish held on the prong structures 22 will have sufficient leeway with respect to fish secured in adjacent prongs, so that the stringer of the invention affords all of the advantages of the previously available elongated stringers and also, the further advantages of increased accessibility, ease in securing and releasing the fish and preservation of the fish in fresh condition.

Although four such sections are described in the example referred to and shown, it will be appreciated that variations in this number may be accommodated within the scope of the invention, and that although a device of substantial size is generally desirable so that a suitable number of fish of substantial size may be attached thereto, some variation in this respect is possible. However, a suitable form of the invention utilizes an individual section length of from 9 to 16 inches, and the wire form material from which the individual sections are made may have an individual thickness of, for example, ⅛ of an inch, though this latter dimensional characteristic is not critical so long as a sufficient ruggedness for the device is retained.

It will be appreciated that exceptional ease in manufacture is afforded by the construction described, particularly since each of the sections 12 may be formed from a single length of wire. Further, the sections 12 may be readily secured by the bracket means 14 and if welding is used to provide the said bracket means 14, but a single fastening operation is required, since the fastening element 16 may be inserted into the welding so that a connection between the respective parts of the device may be accomplished simultaneously.

In use, therefore, the fisherman may transport the stringer 10 by securing one of the prongs through a portion of his belt and retaining the end of the prong within the associated retainer head 36. The device may also be readily carried in a ruck sack, or creel, and since it is relatively light in weight and easily handled, there will be no difficulty in removing it from the ruck sack, nor any need for disentangling the device from the creel, as with previously available stringers.

When the fisherman is ready to fish, he may disengage the unit 10 from the belt, or other position where it may be carried, the line 18 for the fastening element 16 being secured either initially or upon use. When a fish has been caught, it is then a simple matter to release one of the prongs 12 from the retaining structure therefor and by grasping the unit 10 with one hand to insert the prong 22 through the fish jaws. As soon as this has been accomplished, the prong may be inserted in the retaining head 36 and the fish will be securely held. It will be observed that a further advantage in this respect is accomplished since there is no possibility of breaking of a stringer line, as a result of the rugged wire construction for the device.

The operation described may be repeated as often as desired without difficulty, and because of the commodious nature of the stringer 10, it is extremely unlikely that a catch will exceed the capacity thereof.

Accordingly, I have provided a fish stringer which is unusually simple and compact, easily handled, and which affords advantages both in engaging the fish initially and in retaining the fish in a fresh condition. When the fish has been inserted in the stringer the device may be lowered into the water and the fish will be kept there in good condition since breathing is not interfered with by piercing the gills as with previously available devices. However if it is desired to retain the fish on the stringer in the usual way this also may be easily done.

The fisherman can raise the device 10 from the water simply by pulling on the line 18, and this will not require much effort since the device may be kept fairly close to the surface. Inspection of the fish is correspondingly available as desired, and the catch may be viewed while it is in the water. Again, the line 18 permits the fisherman to carry the catch in any desired position and the previously encountered difficulty in carrying a long string of fish is eliminated. And the fish will be kept in reasonably fresh condition during transit.

Although I have herein set forth and described my invention with respect to certain specific principles and details, thereof, it will be understood by those skilled in the art that these may be varied without departing from the spirit and scope of the invention as set forth in the hereunto appended claim.

I claim as my invention:

A fish stringer comprising, four spring pins each having a rear leg, a central upstanding bracket enclosing and rigidly securing the rear legs of said pins with the pins being 90° apart and said bracket rigidly non-yieldingly supporting said legs, said bracket being the sole support for said pins and positioned at the mid-portion of said legs with yieldable free leg portions above and below the bracket, the lower portion of each pin leg having a wound loop bottom projecting radially out from said leg, each loop bottom terminating in an upstanding prong biased outwardly from said rear leg, a sharp point on the terminal end of each prong, each rear leg having a hook-shaped top and extending radially outward and downwardly from the leg, each said top end having a prong receiving recess to releasably retain the pointed end of the prong, said upstanding central bracket and multiple leg assembly holding said prongs in circumferentially spaced relationship to receive fish jaws without piercing the fish gills to thereby hold the fish in relatively free swimming relationship around said central bracket with said yieldable free leg portions above and below the bracket affording resiliency to the pins relative to the bracket and both of said portions bending with forces on the pins from attached fish, and a central coaxial retainer extending downwardly between the upper portions of said pin legs and free from attachment thereto being secured to said bracket and having a loop at the upper end below the hook-shaped tops of the pins for attachment of a support line radially within said pins.

References Cited in the file of this patent

UNITED STATES PATENTS

| | | |
|---|---|---|
| 1,212,087 | Mikell | Jan. 9, 1917 |
| 2,804,247 | Gallagher | Aug. 27, 1957 |

FOREIGN PATENTS

| | | |
|---|---|---|
| 24,431 | Great Britain | Dec. 20, 1895 |